United States Patent [19]

Kyi

[11] Patent Number: 5,012,085

[45] Date of Patent: Apr. 30, 1991

[54] SELF ADAPTIVE AND SHADOW SENSITIVE ELECTRONIC MUSICAL INSTRUMENT

[76] Inventor: Ben-I Kyi, 1272 Mt. Quail Cir., San Jose, Calif. 95120

[21] Appl. No.: 413,628

[22] Filed: Sep. 28, 1989

[51] Int. Cl.[5] .......... G01V 9/04

[52] U.S. Cl. .......... 250/221; 250/208.4

[58] Field of Search .......... 250/208.2, 208.4, 208.5, 250/221, 229; 341/31; 84/DIG. 19, 724

[56] References Cited

U.S. PATENT DOCUMENTS

| | | | |
|---|---|---|---|
| 4,504,933 | 3/1985 | Janney | 367/197 |
| 4,699,038 | 10/1987 | Wedge | 84/658 |
| 4,707,597 | 11/1987 | Schulz-Henig et al. | 250/206.2 |
| 4,785,703 | 11/1988 | Ichiki | 84/634 |

*Primary Examiner*—David C. Nelms

[57] ABSTRACT

A self adaptive and shadow sensitive electronic musical instrument is disclosed. The invention utilizes digital techniques to sense the shadow over any one of the photo cell. There is a reference photo cell's generates a threshold voltage which would be adapted to the ambient light source. Each shaded photo cell generates frequency voltage which will be compared with the reference photo cell's threshold voltage to decide the frequency should be ON or OFF (because the invention uses one bit to represent one photo cell's frequency at 2 MHz sample rate). Then the instrument generates a sound wave shape which is in proportion to the sum of the shaded photo cells' frequency.

1 Claim, 1 Drawing Sheet

SELF ADAPTIVE AND SHADOW SENSITIVE ELECTRONIC MUSICAL INSTRUMENT

FIELD OF THE INVENTION

This invention relates to musical instruments and specifically to create an high speed shadow sensitive one bit per photo cell polyphonic type instrument.

PRIOR ART

General musical instruments use a touch-sensitive keyboard as the input device such as "Touch Sensitive Electronic Musical or Sounding Generating Instrument" of Wedge U.S. Pat. No. 4,699,038 and the "Polytonal Automatic Accompaniment Apparatus" of Ichiki U.S. Pat. No. 4,785,703. Some musical instruments use a specific light source for the light sensor to generate music. There is no optic musical instrument does which not need any specific light source and can self adjust its light sensitivity by ambient light source.

The present invention can simutaneously put all the shaded photo cells' frequency together by using digital multiple one bit adder. It uses one bit to represent one photo cell's frequency, then uses high speed 2 MHz clock to parallelly add those frequency together. The result represents the time wave form that will keep high fidelity.

SUMMARY OF THE INVENTION

The primary object of the present invention is to provide a self adaptive and shadow sentitive electronical musical instrument that can be utilized with one bit per photo cell polyphonic type instrument.

It is also an object of the present invention to provide a musical instrument that can follow the variety of ambient light luminosity, then self adjust its light sensitivity. To sense the shadow over its photo cell, it uses digital techniques to keep its high accurary and high sensitivity. The self adaptive reference threshold voltage design will not change its reference voltage when temporary shadow is over the reference photo cell. Because this invention will lock the brightest light's voltage within a long period of time.

The present invention uses a 2 MHz high sample rate clock to provide a high fidelity and high speed shadow sensitive musical instrument. The invention also uses a high speed multiple one bit adder to implement the multiple frequency combinational generator which produces a real time one bit per photo cell polyphonic type instrument.

Another object is to provide a simple, inexpensive, and user friendly musical instrument.

A further object of the present invention is to provide a self adaptive musical instrument for ambient lights, so it can used indoor or outdoor with any kind of light sources.

Because the present invention does not require specific light source. and does not use infrared ray or magnetic sensors, it is harmless to human body.

BRIEF DESCRIPTION OF THE DRAWINGS

The FIG. shows a schematic of an embodiment of the invention

The reference photo sensor 1 generates a reference voltage V1. When shadow is above the reference photo sensor, the voltage V1 is higher than the voltage under the ambient light source. This dynamic reference voltage goes to an analog to digital converter 2 to generate digital data. The digital data is loaded to register 3. Then the digital data DA will be compared with register 4 data DB (register 4 is initially loaded with the largest data). If DA is less than DB, register 4 will change to DA; otherwise, it remains unchanged. After a certain amount of time T (T is generated from timing controller 22. T is initialized to very few seconds. After 10 seconds, it will change to one minute), the register 4 data DB will load to register 6. This means register 6 data will be updated to the smallest data in T period. Then the register 6 data goes to a digital to analog converter 7 to convert the data to analog voltage. This analog voltage is called reference voltage VR.

Figure 1:
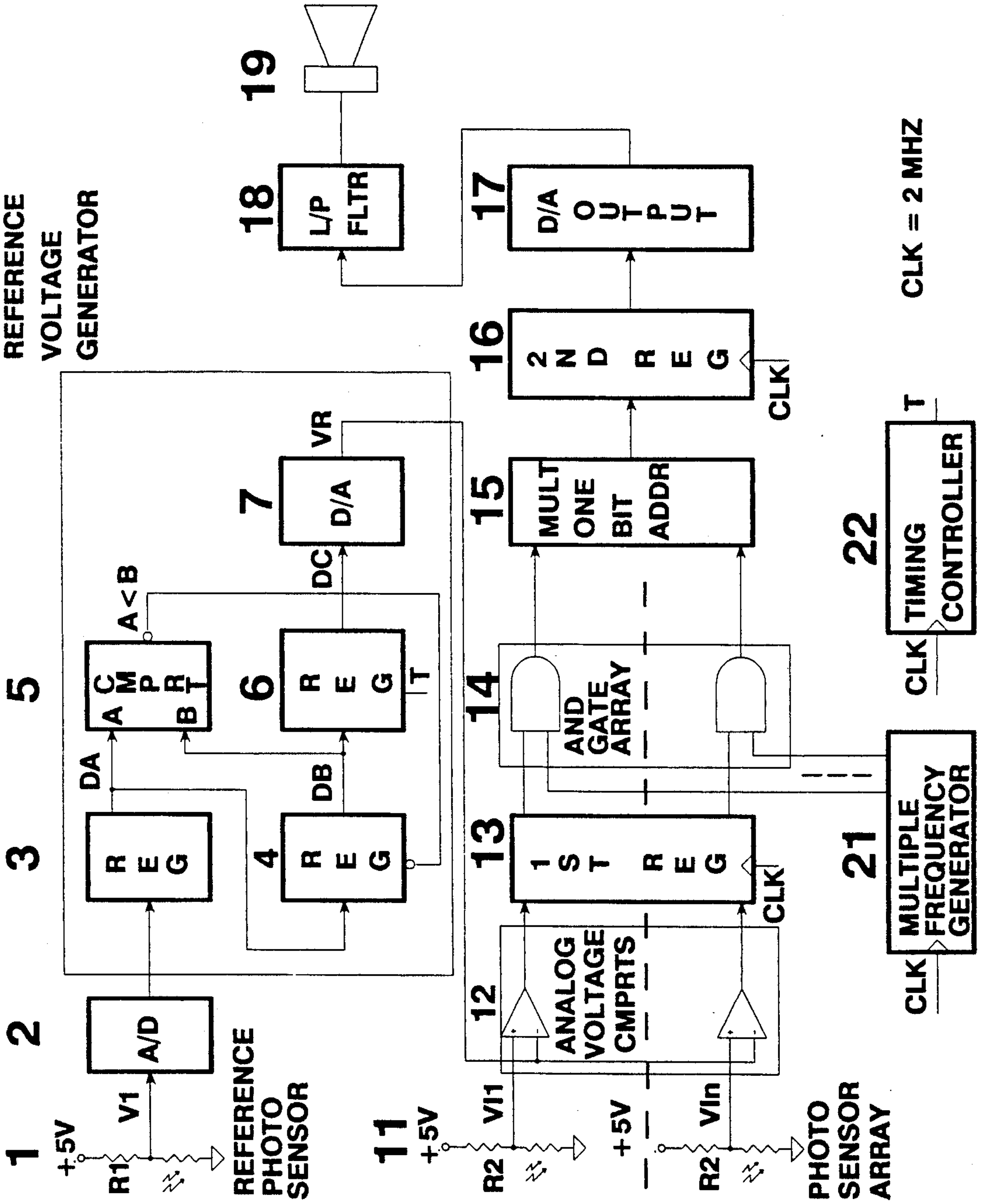

The photo sensor array 11 is used as a photo sensor input device. When the shadow is over any one of the photo sensor, the corresponding voltage VIi will rise. This voltage VIi is the "+" input of voltage comparator 12, it will be compared with the "−" input which is the reference voltage VR. If the voltage VIi is higher than the reference voltage VR, then the output of the voltage comparator 12 is logical one; otherwise, it is logical zero.

These voltage comparators digital output will load to register 13. Then the data will be logically anded with the frequency from the multiple frequency generator 21 by AND gate array 14. The results of AND gates 14 AND gate array 14 are added by a multiple one bit adder 15. Then the sum is loaded to register 16. It then goes to a digital to analog converter 17. The analog data goes through a low pass filter 18, then goes through a sound output 19.

The register 13, register 16, frequency generator 21, and timing controller 22 use a 2 MHz clock for high speed sample rate, high accurracy, and synchronous design.

I claim:

1. A Self adaptive and shadow sensitive electronic musical instrument generates music when shadow over any one of photo sensors, comprising:

- a reference photo sensor means for generating a voltage V1 which is in proportion to the intensity of the ambient light;
- an A/D converter means connected to the reference photo sensor means for converting V1 from analog voltage to digital voltage;
- a reference voltage generator means for generating the brightest light intensity value DC within a certain amount of time T, where T is generated from the timing controller;
- a D/A converter means for converting the brightest intensity value DC to an analog voltage VR which is called reference voltage;
- photo sensor array means for generating voltages VI for photo sensors, where the voltage VIi for photo sensor i depends on the intensity of the light above the corresponding photo sensor;
- analog voltage comparators means for comparing voltages VI with the said reference voltage VR, when the voltage VIi is higher than the reference voltage VR, which means a shadow is above the photo sensor, then the output of the corresponding comparator is logical one; otherwise, the output is logical zero;
- a first register means for synchronizing the outputs from analog voltage comparators;
- a multiple frequency generator means for generating frequencies for corresponding photo sensors;

AND gate array means connected to the first register means and to the multiple frequency generator means for performing logical AND operations of which a logical one is output for each corresponding shaded photo sensors;

a multiple one bit adder means for adding all the outputs of AND gate array that the result will be the sum of all shaded photo sensors frequencies;

a second register 3 means for intermediately storing the result of said multiple one bit adder; and an output D/A converter means connected to the register 16 means for generating an analog voltage which is corresponding to the digital value of said second register 16.

* * * * *